United States Patent [19]

Baublits

[11] Patent Number: 5,690,452
[45] Date of Patent: Nov. 25, 1997

[54] SPRING LOADED AUTOMATIC PLUG EJECTOR OR HOLE SAWS

[76] Inventor: David G. Baublits, 15306 33rd Ave. East, Tacoma, Wash. 98446

[21] Appl. No.: 671,182

[22] Filed: Jun. 27, 1996

[51] Int. Cl.$^6$ .................................................. B23B 51/04
[52] U.S. Cl. ........................ 408/204; 408/206; 408/703
[58] Field of Search ........................... 408/204, 68, 703, 408/205, 206, 193

[56] References Cited

U.S. PATENT DOCUMENTS

| | | | |
|---|---|---|---|
| 1,231,551 | 7/1917 | Alexander | 408/204 X |
| 1,234,467 | 7/1917 | Hamilton | 408/68 |
| 2,435,648 | 2/1948 | Frevel | 48/68 |
| 3,180,018 | 4/1965 | Hougen | 408/68 |
| 3,267,975 | 8/1966 | Enders | 143/85 |
| 3,390,596 | 7/1968 | Trevathan | 408/206 X |
| 4,755,087 | 7/1988 | Parent | 408/68 |
| 5,076,741 | 12/1991 | Littlehorn | 408/68 |
| 5,082,403 | 1/1992 | Sutton et al. | 408/68 |
| 5,108,235 | 4/1992 | Czyzewski | 408/204 |
| 5,226,762 | 7/1993 | Ecker | 408/204 |
| 5,435,672 | 7/1995 | Hall et al. | 408/68 |

FOREIGN PATENT DOCUMENTS 904860 11/1945 France ............................. 408/68

*Primary Examiner*—Daniel W. Howell
*Assistant Examiner*—Henry W. H. Tsai
*Attorney, Agent, or Firm*—Keith D. Gehr

[57] ABSTRACT

A spring loaded automatic plug ejector for hole saws which utilizes a spring 50 which is increasingly compressed while a hole is being drilled. Once the hole is drilled, the spring 50 decompresses and ejects the plug from the hole saw. The amount of spring tension applied to the plug is adjusted by varying the degree to which the spring is compressed.

26 Claims, 4 Drawing Sheets

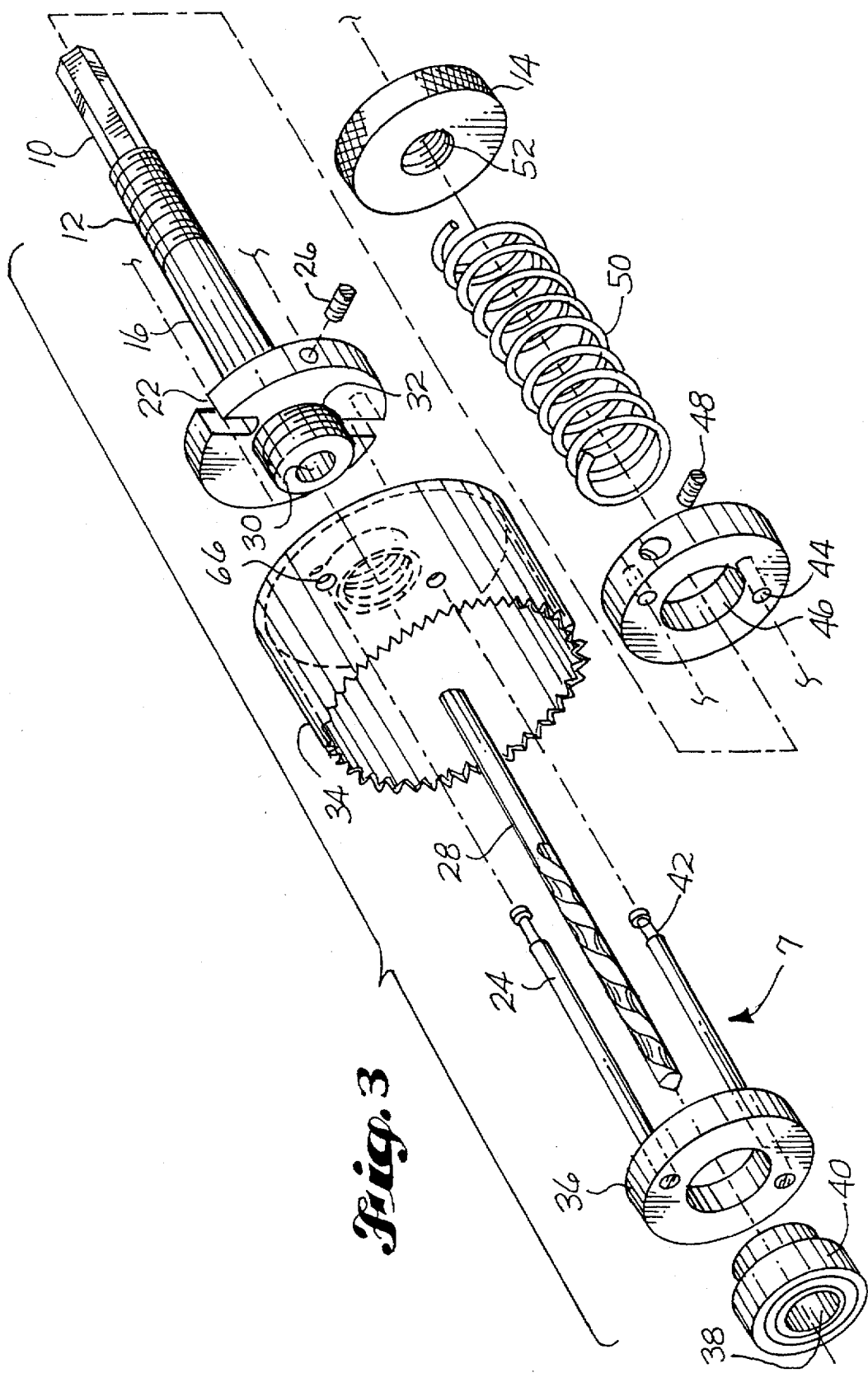

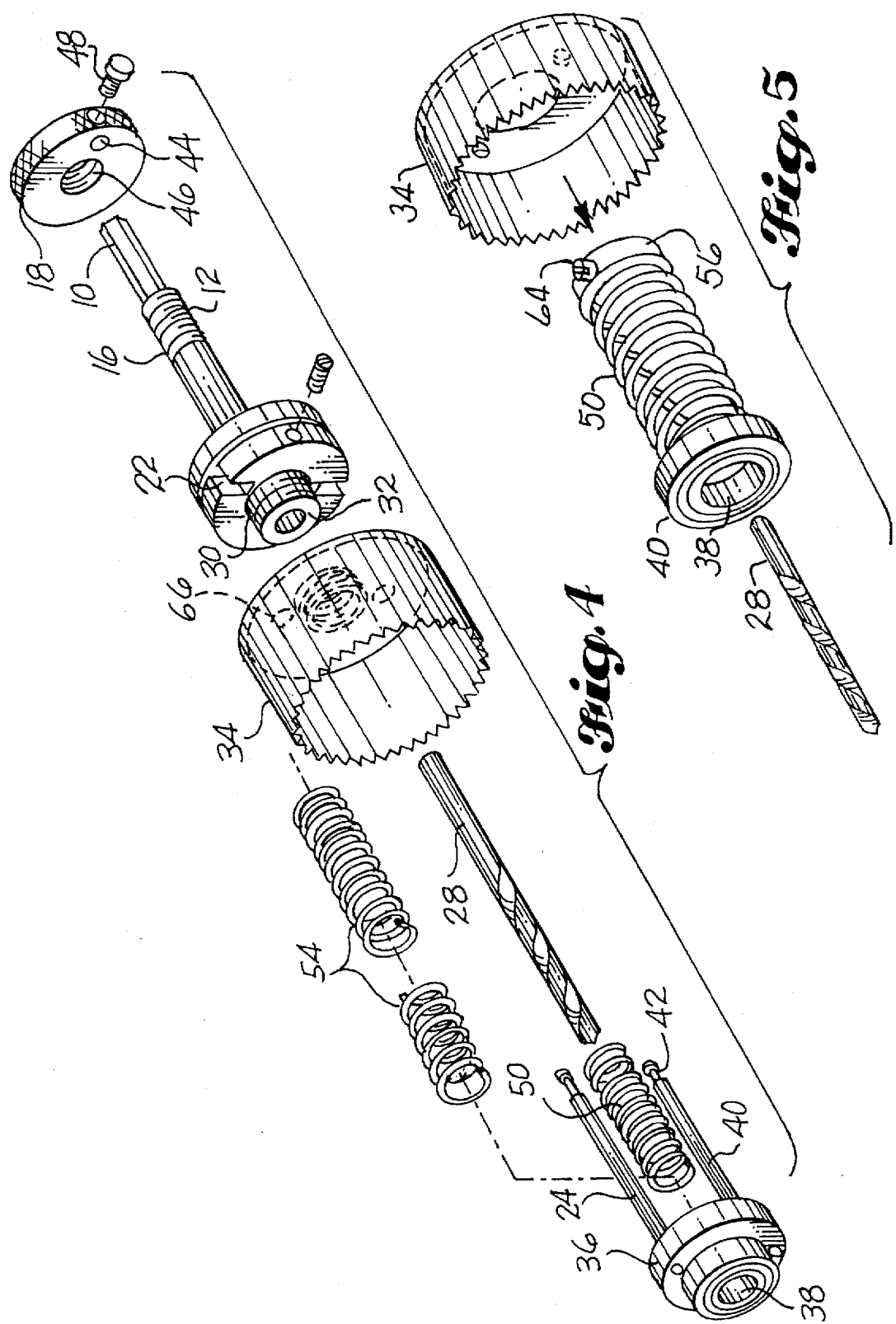

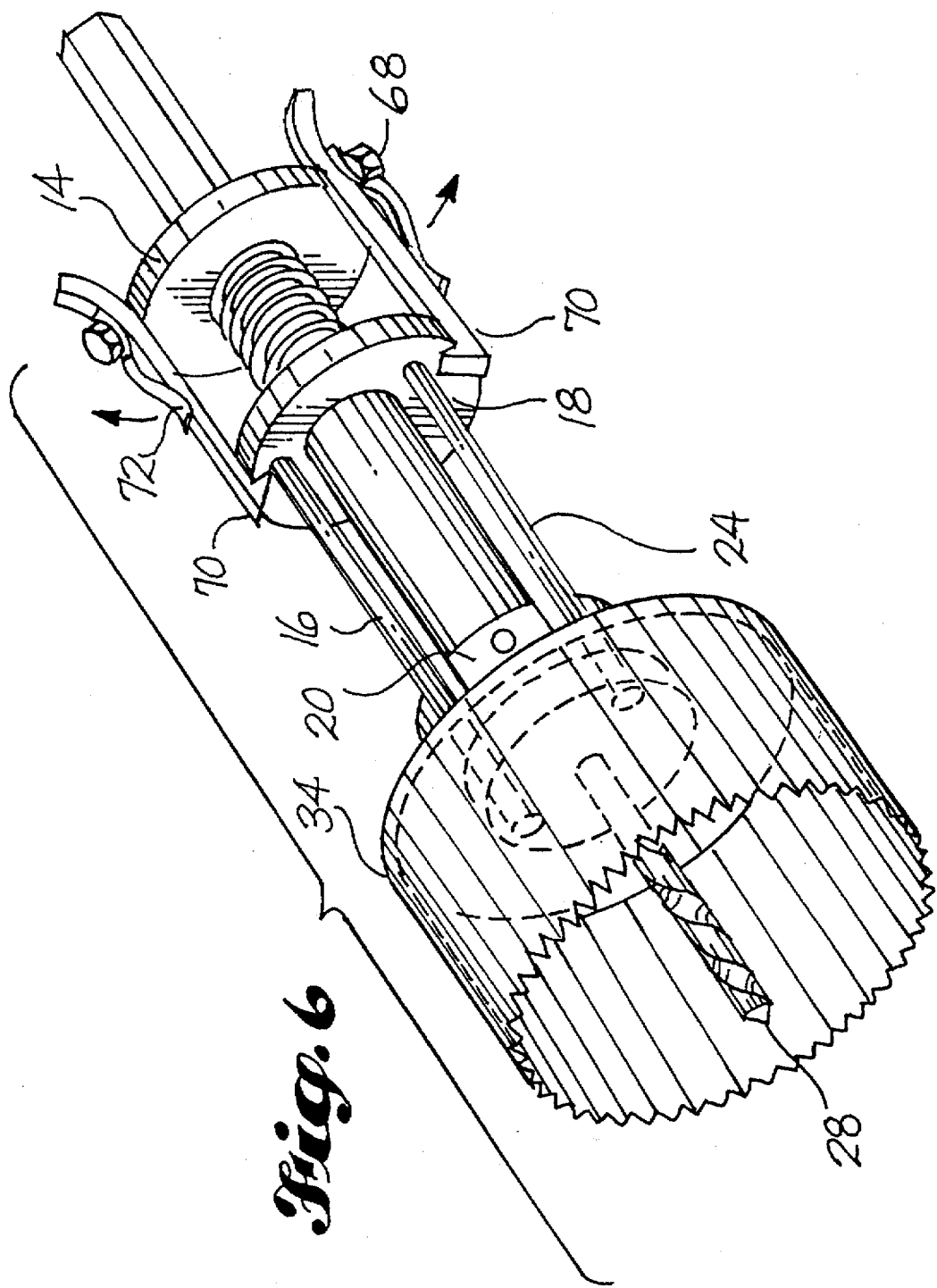

SPRING LOADED AUTOMATIC PLUG EJECTOR OR HOLE SAWS

This invention relates to tooling, specifically to tools used for the efficient removal of plugs from hole saws.

BACKGROUND OF THE INVENTION

The removal of plugs from saws designed to cut circular holes has been a problem since the hole saw was first invented. A hole saw is a piece of metal formed into a circle with a serrated cutting edge. This circular tool is then mounted in a power source. The power source spins the saw with the serrated cutting edge against a working surface which cuts the surface in a circular pattern. Once a hole saw has cut through a piece of material ( wood, metal, etc.), the round plug which has been cut out tends to get lodged in the hole saw itself and can be quite difficult and time consuming to remove causing a decrease in productivity and an increase in frustration. Many people have approached this problem and designed a variety of mandrels to facilitate plug removal. U.S. Pat. No. 5,082,403 to Sutton and Valkenburg and U.S. Pat. No. 5,435,672 to Hall and Szymanski both utilize a threaded arbor which threads through the base of the hole saw. When the saw itself is held stationary and the rotation of the holding drill is reversed, the arbor feeds through the hole saw up against the plug and ejects it. These designs are time consuming to use because you have to go through the effort of reversing the drill and waiting for the rotation of the drill to feed the arbor up a sufficient distance to eject the plug and then you must reverse the rotation again and wait for the arbor to feed back to its original position. The inherent design of these mandrels also require that the holding drill is reversible which in the case of drill presses and many hand held drills is not available. Also, Sutton and Valkenburgs mandrels are designed in such a way that the majority of the hole saws on the market in the United States cannot be used because most hole saws require drive pins inserted through the base to drive the saw and these mandrels have no drive pins.

U.S. Pat. No. 5,226,762 to Ecker utilizes a long drive shaft with long drive pins which slide up and down the drive shaft. When the user wants to eject a plug, he slides the drive pins up through the drive pin holes in the bottom of the hole saw up against the plug and manually pushes the plug out. Once again, the drill motor must be stopped causing a loss in productivity and the pins must be pushed up by the user against the plug and ejected manually. In many cases the amount of pressure required to eject the plug is greater than the amount of pressure that can be applied manually by the user which forces the user to eject the plug by some other means. Ecker's design is also very complicated and expensive to build compared to the standard drive mandrels available on the market thereby making it a costly alternative.

Heretofore, plug ejection mandrels available on the market suffer from the following disadvantages:

(a) They are time consuming as they require the user to stop the drill, reverse the drill, grab the hole saw (which is sometimes very hot), feed the arbor through the hole saw, eject the plug and then reverse the drill again and feed the arbor back to its original position; or (b) They require the user to stop the drill, manually grab a sliding drive pin mechanism and push it up against the plug with enough force to eject the plug (which is not always possible) and manually return the slide mechanism to its original position.

(c) They require that the drive mechanism be reversible.

(d) They are complicated designs which decrease their marketability due to potential malfunctions and high cost of manufacture.

All attempts thus far to make ejection of the plug easier have required that the drill be stopped while the user utilizes features of the particular hole saw mandrel they are using to manually eject the plug. This requires time which decreases available production time and increases manual effort which causes greater operator fatigue.

OBJECTS AND ADVANTAGES

Accordingly, several objects and advantages of my invention are:

(a) to provide a tool which automatically ejects the plug from a hole saw without any extra movement required by the operator;

(b) to provide a tool which allows for adjustment of the amount of pressure applied to the plug to facilitate ejection of different sizes and types of plugs;

(c) to provide a tool which will fit the majority of hole saws currently available on the market;

(d) to provide a tool which is quick and easy to use;

(e) to provide a tool which will eject a plug without stopping or reversing the drive mechanism; and (f) to provide a tool which is of simple construction and easy to manufacture and therefore affordable.

Still further objects and advantages will become apparent from a consideration of the ensuing description and accompanying drawings.

BRIEF DESCRIPTION OF THE DRAWINGS

FIG. 3 is an exploded view of a spring loaded mandrel disassembled showing the component parts.

FIG. 4 shows a spring loaded mandrel where the spring is located in the hole saw itself rather than on the drive shaft.

FIG. 5 shows a spring loaded insert which fits inside a hole saw and is attached to a drill bit.

FIG. 6 is a-spring ejection mandrel with a locking mechanism.

PREFERRED EMBODIMENTS—DESCRIPTION

Figure 1:
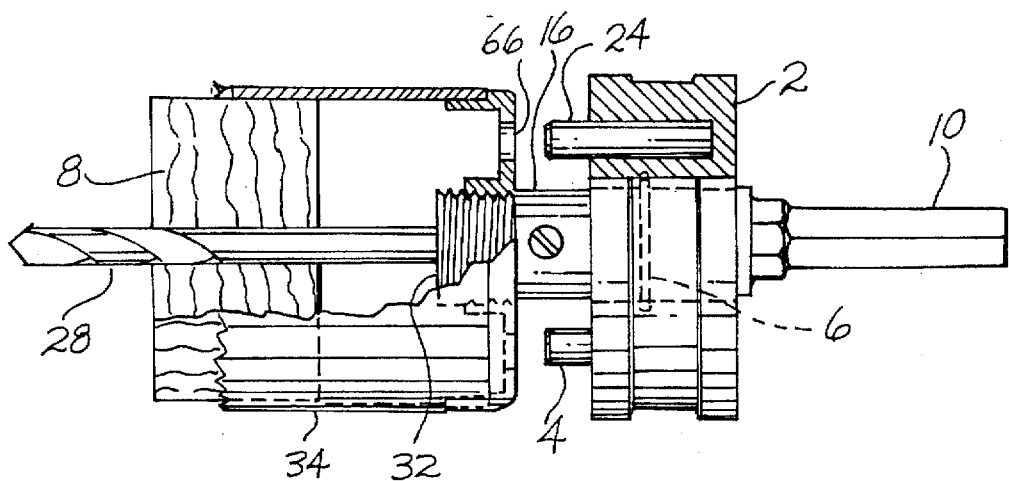
FIG. 1 shows a standard mandrel design.

A conventional mandrel is shown in FIG. 1. The retaining ring 2 is pulled down toward the proximal end 10 of the mandrel while the hole saw 34 is being screwed on to the threaded distal end of the shaft or mandrel. Once screwed into position, the retaining ring 2 is slid up toward the distal end 32 and the short drive pins 4 are inserted into the drive apertures 66 of the hole saw 34. Normally, the retaining ring 2 is held in place by a c-ring 6 located under the retaining ring 2 which applies friction to the retaining ring 2 holding it in place. The hexagonal proximal end 10 of the mandrel is then inserted into a drive mechanism and the tool is ready for use. Once the hole has been drilled, the plug 8 is left inside the hole saw and must be removed before the hole saw can be used again. This mandrel is not designed to assist with the removal of this plug 8 in any way.

Figure 2:
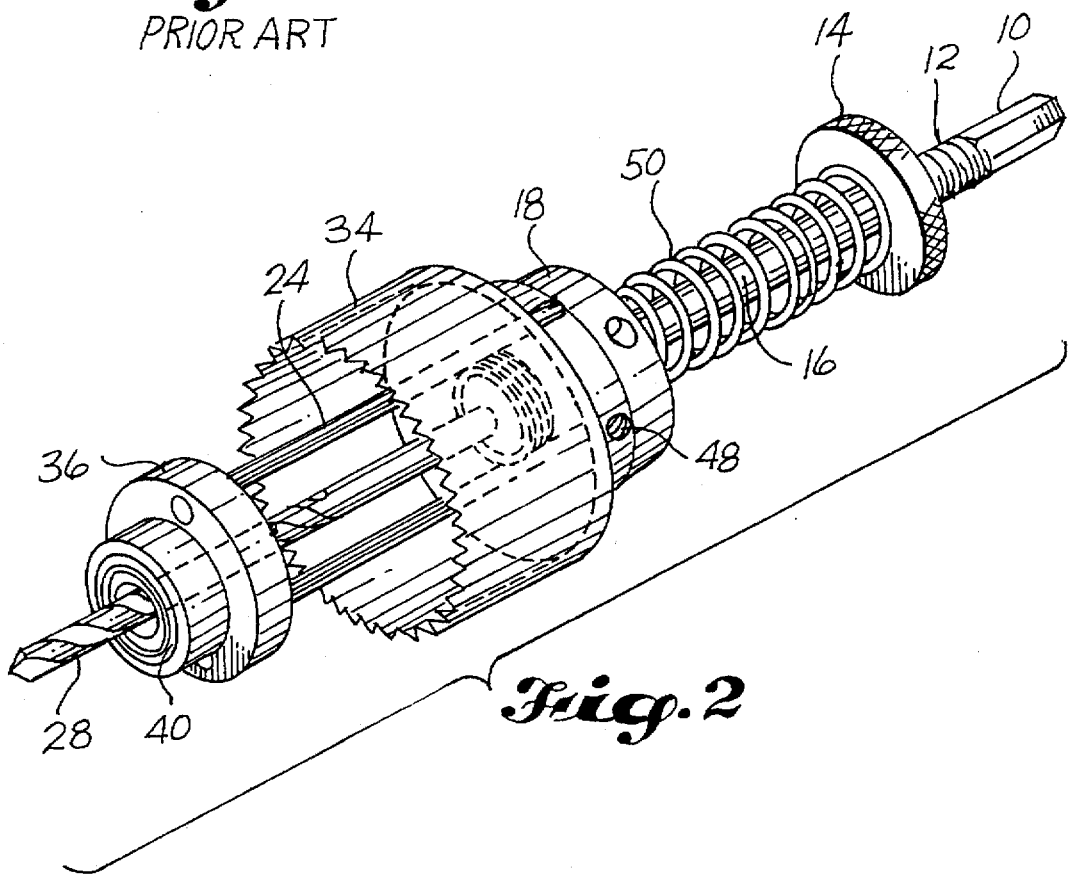
FIG. 2 shows a spring loaded mandrel ready for use with a hole saw attached.

Referring now to FIGS. 2 and 3, a typical embodiment of my invention is illustrated. The drive shaft of the mandrel, generally shown at FIG. 3 consists of a hexagonal proximal end 10 which is inserted into the drive mechanism, a threaded portion 12 on which a spring stop or tension adjustor 14 threads onto a shaft or mandrel 16 with a diameter which allows the slide ring 18 to slide up and down, a shoulder 20 which has drive pin slots 22 machined in it that allow for the drive pins or push rods 24 to pass through the hole saw drive aperatures 66 and through the shoulder 20. Shouder 20 also has a lock screw 26 which threads into the shoulder 20 and secures the pilot drill bit 28 which is inserted into the center hole or socket 30. Finally, the drive shaft has a threaded distal end 32 which the hole saw 34 attaches to. The drive pins or push rods 24 are attached to a bearing holder 36 which has a relief hole 38 that allows for the drill bit 28 to move up and down freely within it. The bearing e.g. a ball bearing 40 which has a similar relief hole 38 spins independently of the bearing holder 36 The drive pins or push rods 24 have a turned down diameter 42 which fit into the pin holes 44 on the slide ring 18 when the hole saw is in its installed position. The slide ring 18 also has a large center hole 46 which allows the ring 18 to slide on the shaft or mandrel 16 and at least one locking screw 48 which tightens down against the drive pins or push rods 24 when they are in their installed position. The compression spring 50 is installed between the slide ring 18 and the spring tension adjustor 14 which is screwed onto the threaded portion 12 of the drive shaft using the threads tapped in the center hole 52 of the adjustor 14.

An alternative embodiment is shown in FIG. 4. In this embodiment, the spring 50 is installed over the drill bit 28 inside the hole saw 34. Different springs 54 with varying tensions could be correspondingly installed depending on the amount of tension needed to eject the plug being drilled out. This eliminates the need for any tension adjustments on the main shaft or mandrel 16. All other features remain the same as the embodiment described above.

There are various possibilities in regard to how the spring could be positioned to eject the plug. FIG. 5 shows an insert for a conventional mandrel rather than a whole mandrel. One end of the spring 50 is attached to a mounting ring or collar 56 which has a tapped hole 62 machined in the mounting ring or collar 56 and a set screw 64 which would tighten down on the drill bit 28 holding it in position. A magnet could also be used at this end as the hole saw and the mandrel are made of steel so the magnet would hold the spring in position. The other end of the spring would be attached to a flat washer or preferably a bearing 40 which would butt up against the surface being drilled during use. The bearing, if used, would spin independently of the spring 50 during use. The bearing 40 would have a relief hole 38 which would allow the drill bit 28 to move freely within the bearing 40. The tension applied to the plug would be adjusted by moving and tightening the spring unit up and down on the drill bit. The mandrel itself could have drive pins which would slip into drive pin holes but they are not a necessity.

FIG. 6 shows an embodiment which has all the features described in the invention shown in FIGS. 1 and 2 with the addition of a mechanism to lock the spring in its compressed position. The spring stop or tension adjustor 14 has two lock bar set screws 68 which secure two spring lock bars or hooks 70 to the spring tension adjustor 14. On each lock bar or hook 70 there is a flat tension spring 72 which pushes the two lock bars or hooks 70 towards the center of the mandrel. When the slide ring 18 is slid down the shaft or mandrel 16, the lock bars or hooks 70 hook over its edge and hold it in place. When the lock bars 70 are released, the compression spring pushes the slide mechanism up and impacts the plug which ejects it. As the slide mechanism on this embodiment does not touch the working surface while it is being drilled, there is no need for a bearing 40.

Springs are a convenient way to provide tension against the plug being ejected, but any medium which is compressable that would apply tension against the plug could be used. From the descriptions above, a number of advantages of my spring loaded automatic plug ejection tool become evident:

(a) In its preferred embodiment, it provides a tool which automatically ejects the plug from the hole saw without any extra movement by the operator.

(b) It provides a tool which allows for adjustment of the amount of pressure applied to the plug to facilitate ejection of different sizes and types of plugs.

(c) It provides a tool which will fit the majority of the whole saws currently available on the market.

(d) It provides a tool which is quick and easy to use.

(e) In its preferred embodiment, it provides a tool which will eject a plug without stopping or reversing the drive mechanism.

(f) It provides a tool which is of simple construction and easy to manufacture and therefore affordable.

PREFERRED EMBODIMENTS—OPERATION

The method of use of the invention shown in FIG. 2 and FIG. 3 is to take the assembled mandrel unit ( without hole saw) and loosen the locking screw 48 located on the slide ring 18. This releases the drive pins or push rods 24 so that the drive pin/bearing assembly can be removed. A hole saw 34 can now be installed on the mandrel by screwing it onto the threaded portion 32 of the main shaft or mandrel 16. The hole saw drive apertures 66 in the base of the hole saw 34 are aligned with the drive pin slots 22 which are machined in the shoulder 20 on the main shaft or mandrel 16. The drive pin/bearing assembly 7 is then inserted through the apertures 66 in the base of the hole saw 34, through the slots 22 in the mandrel and into the pin holes 44 in the slide ring 18. The locking screw or screws 48 are then tightened against the turned down diameter 42 of the drive pins or push rods 24 thereby holding the drivepin/bearing assembly 7 firmly in place. A drill bit 28 is then inserted in the center hole or socket 30 of the mandrel and held in place with the lock screw 26. The invention is now ready for use. The hexagonal proximal end 10 of the mandrel is inserted into a drive mechanism and clamped in position. As the operator drills a hole, the drive pin/bearing assembly 7 slides down the shaft or mandrel 16 away from the surface being drilled compressing the spring 50 as it does so. When the hole saw 34 cuts through the object being drilled, the spring, now in compression, applies pressure to the slide ring 18 which in turn applies pressure to the drive pins 24, the bearing 40 and finally the plug that was just drilled out, ejecting it from the hole saw 34. If the pressure applied is not groat enough to eject the plug, the operator turns the spring tension adjustor 14 on the threaded portion 12 of the mandrel to compress the spring 50 thereby applying more tension to the plug. Conversely, if the pressure is too great, the operator turns the spring stop or tension adjustor 14 to decompress the spring 50 thereby decreasing the amount of pressure being applied to the plug.

The embodiment shown in FIG. 4 functions in the same way as the invention shown above except there is no tension adjustment mechanism on the main shaft or mandrel 16. Instead the spring 50 is inserted inside the hole saw 34 around the drill bit 28 before the drive pin/bearing assembly 7 is installed. The tension is adjusted by using different springs 54 which have different compression ratios. If more tension is needed, the operator would remove the spring being used and insert a different spring 54 which requires greater force to compress thereby applying more pressure to the plug. Conversely, a different spring 54 which would require less pressure to compress would be used if the pressure being applied to the plug was too great.

The embodiment shown in FIG. 5 will work with most the mandrels available regardless of their design. The spring assembly 9 is slid over the drill bit 28 and then tightened down to the bit 28 with the set screw 64. As the operator drills a hole, the spring is compressed. When the hole is drilled, the spring 50 pushes against the plug and ejects it. If the spring 50 needs to be stronger or weaker, there are several options. The operator can move the spring assembly 9 up or down on the drill bit 28 and tighten it down in its new location or move the drill bit 28 up or down in the mandrel while the spring assembly 9 is attached to it. As the spring is moved up, it applies greater force to the plug and as it is moved down it applies less force to the plug. Or, the operator can also remove the spring assembly 9 and replace it with a spring assembly 9 with a stronger or weaker different spring 54 to adjust the tension.

The mandrel with a spring locking mechanism shown in FIG. 6 works much the same way as the invention shown in FIGS. 1 and 2. The main difference is that before the operator starts to drill a hole, he pulls the slide ring 18 down the shaft or mandel 16 and locks it in position using the lock bars or hooks 70. The hole is then drilled. Once the hole is drilled, the operator releases the lock bars or hooks 70 which allows the slide ring 18 to slide up the shaft 16 as the spring 50 decompresses. The end of the slide ring mechanism impacts the plug in the hole saw 34 forcefully and ejects it. In this version, the bearing holder and bearing may not be necessary as the slide ring mechanism does not contact the work surface while the hole is being drilled.

Accordingly, the reader can see that there are a multiple number of advantages to my spring loaded automatic plug ejection tool including:

In its preferred embodiment it ejects the plug automatically without any extra movements by the operator.

It has means by which to adjust the tension applied to a plug to facilitate the removal of different types and sizes of plugs.

It will fit the majority of hole saws on the market.

It is quick and easy to use.

In its preferred embodiment it ejects plugs without reversing or stopping the drive mechanism.

It is of simple design and easy to manufacture and therefore affordable.

Accordingly, it can be seen that this invention solves the problem of plug removal from hole saws. The invention causes the plug to be ejected without increased operator labor time as the drive mechanism never has to be stopped or reversed. The frustration and time committed to remove the plugs is eliminated thereby decreasing frustration and increasing productivity.

Although the description above contains many specificities, these should not be construed as limiting the scope of the invention but as merely providing illustrations of some of the presently preferred embodiments of this invention. Various other embodiments and ramifications are possible within it's scope. For example, the mandrel with the spring mounted on the main shaft does not need to be adjustable in most applications. Also, bearings against the work surface decrease the amount of friction generated during the drilling of a hole but a flat surface will work also. The locking mechanism shown in FIG. 6 could be designed in a variety of ways to hold the spring in its compressed position. The important aspect of this embodiment is that the spring is in its compressed position while the hole is being drilled. The spring loaded insert shown in FIG. 5 could be attached to the base of the hole saw rather than the pilot drill.

Thus the scope of the invention should be determined by the appended claims and their legal equivalents, rather than limiting it to the examples given.

I claim:

1. An automatic plug ejector tool for a hole saw which comprises:

a mandrel having a proximal end for mounting the tool in a drive means, said mandrel having a distal end for mounting a standard hole saw;

a bearing means adapted to press against a workpiece when the tool is in use;

a spring compressible by movement of the bearing means as a hole saw mounted on the mandrel is advanced into a cut; and retaining means for holding the spring and bearing means generally in an axial relationship on the mandrel, said retaining means further comprising a slide ring moveable along the mandrel and elongated drive pins to engage a hole saw the pins extending between the bearing means and slide ring parallel to the axis of the mandrel, whereby when a hole saw mounted on the mandrel is advanced into a cut into a workpiece the bearing means acts against the workpiece surface to compress the spring so that when the saw cuts through the workpiece and removes a cylindrical plug which is contained within the saw the spring relaxes to eject the removed plug from the hole saw.

2. The tool of claim 1 in which the drive pins are removably anchored in the slide ring.

3. The tool of claim 2 in which the spring is a coil spring retained between the bearing means and the distal end of the mandrel.

4. The tool of claim 2 in which comprises a spring stop means mounted on the mandrel adjacent the proximal end and the spring is retained between the slide ring and spring stop means.

5. The tool of claim 4 in which the spring stop means is axially moveable along the mandrel to adjust spring tension.

6. The tool of claim 5 in which further comprises latching means to maintain the spring in compressed condition whereby the bearing means may be removed from contact with the workpiece during a cut.

7. The tool of claim 6 in which the latching means comprises a plurality of hooks depending from the spring stop means to engage the slide ring.

8. The tool of claim 7 in which the hooks are biased inwardly toward the mandrel.

9. The tool of claim 1 in which the bearing means is mounted on a bearing holder.

10. The tool of claim 9 in which the bearing means is a ball bearing and in use the bearing can rotate independently of rotation of the bearing holder.

11. An automatic plug ejector tool for a hole saw which comprises:

a mandrel having a proximal end for mounting the tool in a drive means, said mandrel having a distal end for mounting a standard hole saw;

a slide ring moveable along the mandrel, said ring acting as a stop for the leading end of a spring;

a spring stop mounted on the mandrel adjacent the proximal end;

a compressible spring coaxially mounted on the mandrel between the slide ring and spring stop;

a bearing means adapted to rest against a workpiece;

elongated hole saw drive pins extending from the bearing means parallel to the axis of the mandrel, said pins being anchored into the slide ring, whereby when a hole saw mounted on the mandrel and engaged by the drive pins is advanced into a cut in a workpiece the beating means acts against the workpiece surface and the spring is compressed by the drive pins acting against the slide ring so that when the saw cuts through the workpiece and removes a cylindrical plug which is contained within the saw the spring relaxes to eject the removed plug from the hole saw.

12. The tool of claim 11 in which the spring stop is axially moveable along the mandrel to adjust spring tension.

13. The tool of claim 11 further including latching means to maintain the spring in compressed condition.

14. The tool of claim 13 in which the latching means comprises a plurality of hooks depending from the spring stop means to engage the slide ring.

15. The tool of claim 14 in which the hooks are biased inwardly toward the mandrel.

16. The tool of claim 1 in which the mandrel is socketed for retaining an axial pilot drill.

17. The tool of claim 1 further in combination with a hole saw.

18. The tool of claim 17 in which the hole saw has an inside base portion and the spring is a coil spring positioned between the beating means and said base portion.

19. The tool of claim 11 in which the mandrel is socketed for retaining an axial pilot drill.

20. The tool of claim 11 in which the drive pins are removably anchored in the slide ting.

21. The tool of claim 12 in which the spring stop is threaded to the mandrel.

22. The automatic plug ejector tool of claim 11 further in combination with a hole saw.

23. A readily installable and removable automatic plug ejector tool for a hole saw mounted on a mandrel having a pilot drill comprising:

a collar having an axial aperture to pass a pilot drill;

collar attachment means to install the tool within a hole saw;

a bearing holder having a ball bearing adapted to press against a workpiece, the bearing being independently rotatable relative to the bearing holder, said bearing holder and bearing also having an axial aperture sized to pass a pilot drill; and a coil spring axially positioned against between the bearing holder and the collar and fixed to the bearing and collar, the bearing and collar apertures and spring being aligned along an axis common with the axis of the pilot drill when the tool is installed in a hole saw, whereby when the plug ejector tool is installed on a hole saw pilot drill, as the hole saw is advanced to make a cut in a workpiece the bearing acts against the workpiece surface and the spring is compressed so that when the saw cuts through the workpiece and removes a cylindrical plug which is contained within the saw the spring relaxes to eject the removed plug from the hole saw.

24. The tool of claim 23 wherein the collar attachment means is a set screw to attach the tool to a pilot drill.

25. The tool of claim 23 wherein the collar attachment means is a magnetic means to attach the tool to a hole saw.

26. The tool of claim 23 further in combination with a hole saw.

\* \* \* \* \*

UNITED STATES PATENT AND TRADEMARK OFFICE
CERTIFICATE OF CORRECTION

PATENT NO.   : 5,690,452
DATED        : November 25, 1997
INVENTOR(S)  : David G. Baublits It is certified that error appears in the above-identified patent and that said Letters Patent is hereby corrected as shown below:

On the title page, item [54] and
Column 1, line 2, "or" in the title should read --for--.

Column 2, line 45, "a-spring" should not be hyphenated.

Column 3, line 17, "36The" should read --36. The--.

In claim 1, column 6, line 27, "a hole saw the pins" should read --a hole saw, the pins--.

Signed and Sealed this

Thirty-first Day of March, 1998

*Attest:*

BRUCE LEHMAN

*Attesting Officer*            *Commissioner of Patents and Trademarks*